Feb. 26, 1963 S. W. STEARNS 3,078,649
GAS SEPARATOR FOR DRILLING MUD
Filed May 14, 1959 2 Sheets-Sheet 1

Sanford W. Stearns
INVENTOR.

BY *Clarence A. O'Brien*
and *Harvey B. Jackson*
Attorneys

Feb. 26, 1963    S. W. STEARNS    3,078,649
GAS SEPARATOR FOR DRILLING MUD
Filed May 14, 1959

Sanford W. Stearns
INVENTOR.

United States Patent Office 3,078,649
Patented Feb. 26, 1963

3,078,649
GAS SEPARATOR FOR DRILLING MUD
Sanford W. Stearns, Billings, Mont., assignor to Continental Laboratories, Inc., a corporation of Montana
Filed May 14, 1959, Ser. No. 813,244
12 Claims. (Cl. 55—206)

This invention comprises a novel and useful gas separator for drilling mud and more particularly relates to an apparatus especially adapted to release and separate gases which may be entrained in the drilling mud as the latter emerges from the well bore.

The principal and primary purpose of this invention is to provide an apparatus of a compact nature which shall very effectively separate entrained gases from the drilling mud as the latter emerges from the well bore.

Another important purpose of this invention is to provide an apparatus pursuant to the preceding object, which will enable the testing or analyzing of all or a portion of the circulating drilling mud for determining the nature and/or proportions of the gases carried thereby.

Yet another very important object is to provide an apparatus according to the foregoing objects which shall be capable of effectively separating entrained gases from the circulating drilling mud as the latter emerges from the well bore whereby the gas removed may be readily analyzed and the gas free mud can be again prepared for recirculation through the well bore; and whereby this object may be realized without interrupting or interfering with the continuous circulation of the drilling mud.

A further object of the invention is to provide an apparatus in accordance with the foregoing object which shall utilize the benefits of centrifugal force in this apparatus to facilitate a separation of the gas from the mud.

A still further object of the invention is to provide an apparatus in accordance with the immediately preceding object which shall be capable of continued operation even though the centrifugal force is not available or is not employed as an aid to the separation of the gas from the mud.

Another and more specific important object of this invention is to provide an apparatus through which a portion of the circulating drilling fluid may be continuously passed whereby any gas entrained therein from the formation being drilled may be effectively separated from the mud in order that it may be subjected to various tests or analysis.

An important advantage inherent in this invention is the greater facility with which separation is accomplished by causing the flow of mud through many different paths in such an efficient manner that operation may continue without the use of centrifugal force.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
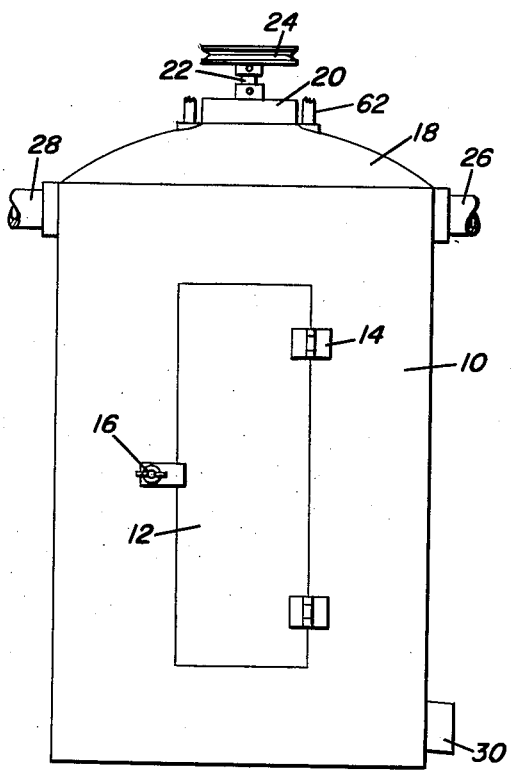
FIGURE 1 is an elevational view of what may be termed a front of a separating apparatus in accordance with this invention, the mud inlet conduits being broken away.
Figure 7:
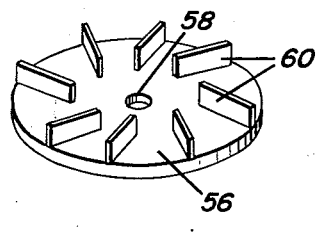
Figure 3:
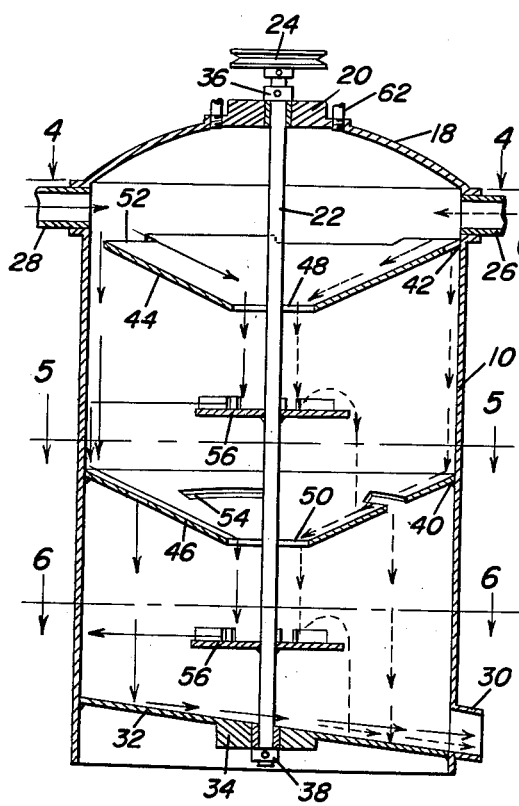
Figure 4:
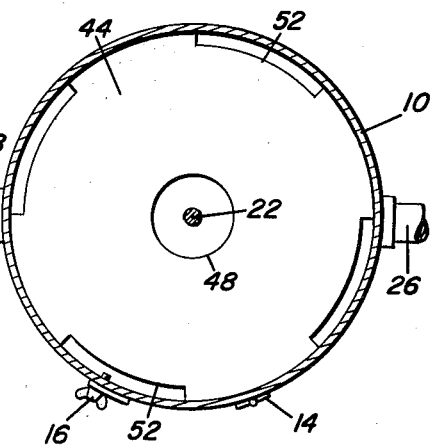
Figure 5:
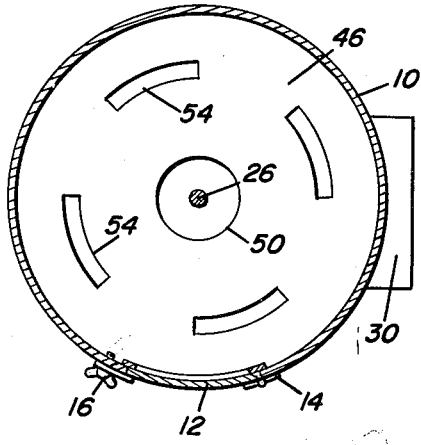
Figure 6:
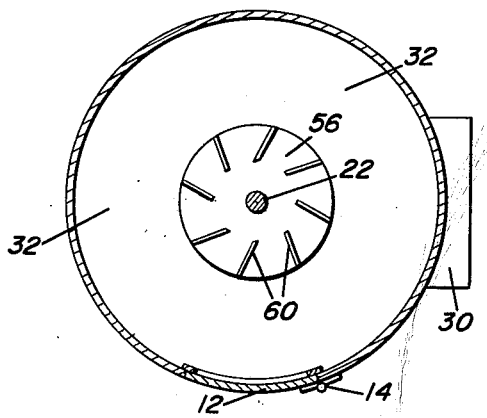

FIGURE 3 is a vertical central longitudinal sectional view taken through the apparatus of FIGURE 1 and showing the internal construction of the separator, the passage of mud therethrough when centrifugal force is employed in the separating operation being shown by the full line arrows therein, while the alternative passage of mud therethrough when centrifugal force is not employed are shown in dotted line arrows therein;

FIGURES 4–6 are horizontal sectional detail views taken substantially upon the plane indicated by the section lines 4—4, 5—5 and 6—6 respectively of FIGURE 3; and FIGURE 7 is a perspective view of one of the centrifugally operated baffle plates in accordance with the invention.

As is well known in the rotary method of drilling, the mud circulated through the drilling string and well bore during the operation of drilling frequently picks up or entrains gases in its passage which must be removed before the mud can be reconditioned for recirculation. It is frequently desirable to separate such gases from all or a portion of the drilling mud, without interrupting the normal circulation of the latter, in order to obtain gas free mud for treatment for recirculating the same, or to test and analyze the separated gases, or both. Various forms of apparatus have been heretofore employed to effect or facilitate the separation and release of the entrained gases from the drilling mud as a prerequisite to sampling, measuring, testing or analyzing the entrained gases. Generally speaking, such apparatuses are divided into two broad classes, namely those which rely primarily upon centrifugal force and agitation of the mud to facilitate the release of the entrained gases and those which rely chiefly upon settling tanks and which latter inherently function to allow the gases to rise to the surface of and thus escape from the mud.

While the centrifugal type of apparatus is compact with respect to the capacity of mud which can be conditioned by the same, and enables a process of continuing separation of gas and mud to be obtained, a failure of the rotary means which produces a centrifugal effect forming the basis of the efficient separating action will necessarily cause a shut-down of the separator. The other method of removing gases from drilling mud, namely that of permitting the mud to settle requires the use of a relatively large tank, and thus a relatively large quantity of the mud which is held in these tanks during the period of time required for the settling operation to release the entrained gases. This in turn represents a relatively large expenditure of money for the quantity of mud which necessarily remains idle during this settling operation.

It is therefore the primary purpose of this invention to provide an apparatus for effectively facilitating the release of and the separation of entrained gases from the entire body of or a portion only of the drilling mud which will utilize and realize the advantages of this centrifugal method of separation, but will avoid the above-mentioned drawback of cessation of the gas separating operation if the centrifugal rotary means should have a failure; and yet avoid the necessity for large settling tanks and a large quantity of mud which remains idle during this settling.

The principles of this invention and the apparatus and its operation as set forth hereinafter are capable, without other change than the size and capacity of the apparatus, to treat a portion only of the mud flow when it is previously intended to separate gas for testing or analyzing operations, or to treat the entire mud flow when it is primarily desired to free the drilling mud of entrained gases in readiness for its recirculation. It will therefore be understood that the apparatus to be now described is inherently capable of either use.

Figure 2:
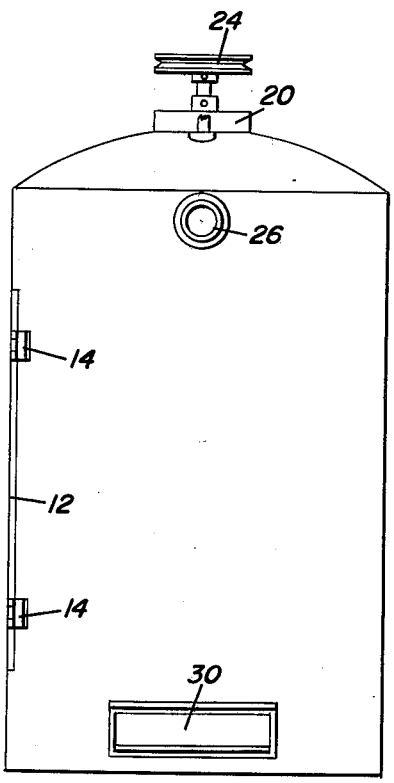
FIGURE 2 is an elevational view taken on the right side of FIGURE 1.

Referring now first to FIGURES 1 and 2 of the accompanying drawings it will be observed that the gas and mud separating apparatus in accordance with this invention consists of a generally erect and vertical cylindrical container or housing designated generally by the numeral 10 and which has in the side wall thereof an access door 12 mounted as by hinges 14 and provided with a closure lock 16. The convexly shaped top wall 18 of the housing has at its central portion a relatively heavy member 20 which constitutes a journal in which is received a vertically disposed rotatable shaft 22 provided with a driving pulley 24 upon its upper end. The pulley, driven from any suitable source of power, not shown, constitutes a means whereby centrifugal force may be generated within the housing as set forth hereinafter.

Extending through the upper portion of the side walls of the container or housing 10 is a plurality of conduits as at 26, 28 which provide means whereby the drilling mud containing entrained gases and the like is to be delivered to the interior of the separator for treatment thereby, while at the lower portion of the receptacle or container 10 there is provided a discharge spout or chute 30 from which the mud with the entrained gases separated therefrom is discharged to any suitable container or conduit by which it is to be returned to the mud circulating system of the drilling rig, not shown.

Referring now more specifically to FIGURES 3-6 it will be observed that the housing or container 10 has an inclined bottom wall 32 therein which slopes down towards and thus discharges to the mud discharge chute or opening 30. At its central portion, the bottom wall 32 is provided with a thickened portion 34 constituting a bearing at which the lower end of the shaft 22 is securely rotatably journalled.

As shown in FIGURE 3, the shaft 22 may have upper and lower collars 36 and 38 removably secured thereto and which embrace therebetween the upper and lower reinforcement or strengthened journal members 20 and 34 for rotatably journalling and securing the shaft therebetween in a vertical position.

Intermediate its ends, the casing 10 is provided with downwardly dished upper and lower partitions 44 and 46 respectively which comprise deflecting baffles for the passage of mud downwardly through the apparatus as set forth hereinafter. These partitions comprising fixed baffle plates are welded to the casing as by welding at 40 and 42. It will be observed that these baffles at their dished central portions are provided with circular openings as at 48 and 50 through which the shaft 22 extends, these openings providing passage means for the mud to pass through each partition of the central portion thereof into the space in the container 10 therebeneath as shown by the arrows in FIGURE 3.

As will be seen from FIGURE 4, the upper baffle or partition 44 is provided with circumferentially extending peripheral passages or cut-away portions as at 52 which permit mud to pass over the rim of this partition as shown by the arrows in FIGURE 3.

Referring to FIGURE 5 it will be observed that the lower baffle partition 46 has a series of arcuately extending circumferentially spaced passages or slots 54 which lie intermediate the center and the periphery of the disks for the passage of mud therethrough as shown by the arrows in FIGURE 3.

Secured to the shaft 22 below the two baffle partitions 44 and 46 are a pair of centrifugally operated baffles in the form of circular plates 56. These plates are of identical construction, being shown more clearly in FIGURE 7. Each plate is centrally apertured as at 58 to receive therethrough the shaft 22, the plate being fixedly secured to the shaft in any desired manner. Upon their flat upper surface the plates are provided with a plurality of outwardly extending vanes or blades 60. As will be seen from FIGURE 7 and from FIGURE 6, these blades are offset from radii of the disk so that they are disposed as secants thereon. The arrangement is such that as the shaft rotates carrying the centrifugal baffles 56 therewith, mud dropping upon these baffles from the openings 48 to 50 lying thereabove as shown by the full and dotted lines of FIGURE 3 will be centrifugally thrown straight outwardly with a whirling motion imparted to the mud by means of these vanes or blades. The mud being thrown outwardly will be thus hurled directly against the interior wall of the casing 10 as shown by the full line arrows of FIGURE 3 from whence it will drop directly to the periphery of the underlying partition 46 or the floor 32.

However, if for any reason the shaft 22 is not rotating, the mud will drop from the openings 48 and 50 above these plates onto a central portion of the plates, and then flow outwardly of the plates and drop from the outer edges thereof as shown by the dotted lines in FIGURE 3 to the partition plate 46 or the floor 32 immediately thereabove.

The operation of this apparatus will be readily understood from the foregoing. With power applied to the shaft 22 so that the centrifugal baffles 56 are rotating, the mud supplied from the well bore through the conduits 26 and 28 will flow upon the perimeter of the upper baffle 44. Some of this mud will drop down through the passages 52 as shown by the full line arrows or the dotted line arrows of FIGURE 3 but the main portion of the mud will flow downwardly across the concave dished surface of the upper baffle 44 towards and then through the central opening 48. Dropping from this opening the mud will then impinge upon the rotating upper centrifugal baffle 56, being hurled outwardly as indicated by the arrows shown in full lines therein against the wall of the casing from which it will again drop to the upper or peripheral edge of the lower partition baffle 46. Flowing inwardly along this dished surface, the mud will then pass through a series of openings 54 whereby part of the mud will be directly dropped to the floor 32 as shown in the arrows in FIGURE 3, while the main body of the mud will pass through the opening 50 and then drop to the lower baffle 56. From the latter it will again be thrown outwardly against the wall of the housing and finally will drop to the floor 32. It will thus be seen that during this passage of the mud there is a series of centrifugal outward throwing of the mud against the wall of the container; flow of the mud down the inclined surfaces; and drop of the mud in free fall between the stationary and rotating baffles to the floor of the device. This will effectively aerate the mud, break up the particles of the same and thus afford ample opportunity for the entrained gases to be released from the mud. These gases will rise and escape as through the vent pipes or conduits as at 62 in the top wall 18. The mud free from its entrained gases will then descend by gravity along the inclined bottom wall 32 to the discharge opening 30 from whence it may be collected in any suitable container or receptacle or may be directly discharged by conduits into the apparatus by which the mud is again circulated through the well bore.

If for any reason the power applied to the pulley 24 and the shaft 22 fails, so that the members 56 will no longer rotate and thus provide the necessary centrifugal force for throwing the mud against the interior wall of the casing 10, the mud will follow the path shown by the dotted line arrows in FIGURE 3. Thus, the mud will enter the conduits 26 and 28, a proportion of the mud then passing through the passages 52 while the remainder will pass through the opening 48. That passing through the passages will drop to the peripheral portion of the lower partition 46, while that passing through the opening 48 will drop directly upon the plate 56. The mud received upon the partition 46 will either pass through the series of passages or slots 54 and thus drop upon the floor 32 or through the opening 50 accompanied by the mud which drops off the now stationary baffle plate 56. From the opening 50 it will drop to the lower baffle 56 and from thence to the floor 32.

This apparatus thus provides a centrifugal means for separating entrained gases from the drilling mud. However, if centrifugal operation of the device fails for any reason, the device will continue to operate, although somewhat less efficiently, as a means to continue the separation of the gas from the mud.

Further, in some instances, it may be desired to use this apparatus solely as a means to effect separation of the mud and entrained gas without the use of centrifugal means. In any event, the mud passes through a series of stages in which it follows freely through the air by different paths so as to break up the mud into a number of smaller streams and facilitate by the agitation of the mud particles the release of the entrained gases therefrom.

It will be understood that any desired number of stationary partitions and the rotary or stationary baffle members 56 may be provided as desired. The apparatus is thus very compact in its nature for providing an adequate opportunity for the mud to be properly agitated and broken up permitting entrained gases to readily escape therefrom.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gas separator for drilling mud comprising a casing having a vertical chamber therein, a series of vertically spaced partitions in said casing having each a central opening and circumferentially spaced staggered passage means therein for interrupted gravity flow of mud between the partitions, a shaft in said casing and extending through said central openings, said central openings being larger than said shaft to form a flow passage through which mud may pass, a series of baffles on said shaft each of which is disposed beneath the central opening of the partition thereabove and is of greater diameter than said central openings, means for supplying drilling mud into the upper end of said chamber above the uppermost partition, means for receiving gases separated from drilling mud from the upper end of said chamber, means receiving mud from which entrained gases have been rereleased from the lower end of said chamber.

2. The combination of claim 1 including means for rotating said shaft, vanes on said baffles extending from the central portion to the periphery thereof whereby to discharge mud outwardly from the baffles by centrifugal force upon rotation of said shaft.

3. The combination of claim 1 wherein said chamber has an inclined bottom wall sloping downwardly towards said mud removing means.

4. The combination of claim 1 including an access door in the side of said casing affording communication with said chamber both above and below the lower partition.

5. The combination of claim 1 wherein said partitions have their passage means at different distances radially from the axis of said shaft whereby mud passing downwardly through said partitions will drop by different vertical paths.

6. The combination of claim 1 wherein said partitions comprise centrally downwardly dished disks.

7. A centrifugal and gravity operated gas separator for drilling mud comprising a casing having a vertical chamber therein, a plurality of vertically spaced, stationarily mounted deflectors in said chamber each deflector having a central opening to form a central passage and each deflector being inclined for directing mud towards said central passage, a plurality of baffles each disposed beneath each central opening and mounted on a shaft for rotation about a vertical axis extending through said central passage, whereby upon rotation of said shaft said baffles will centrifugally lure mud received therein from the opening therefor against the wall of said chamber and when said shaft is stationary, said baffles will drop mud from its periphery upon the deflector or floor of the chamber therebeneath, the uppermost of said deflectors having circumferentially extending and spaced openings for discharging mud therethrough to the deflector thereneath adjacent the periphery of the latter, the next lower deflector having circumferentially extending and spaced slots disposed radially between the central opening and the openings of the uppermost deflector whereby to provide different vertical paths from the paths formed by the spaced openings of the uppermost deflector for mud dropping therethrough, said slots of said next lower deflector disposed radially outward of the periphery of the baffle lying therebeneath, means discharging mud laden with entrained gas into the chamber above the uppermost deflector and at the periphery thereof, means for discharging gas released from the mud from said chamber, means for discharging mud freed of entrained gases from the lower end of said chamber.

8. A mud and gas separator, comprising a plurality of vertically spaced deflecting means each having a central opening and a single series of circumferentially spaced opening on circles of different radii progressively decreasing from an uppermost to a lowermost deflecting means, a shaft extending through the central opening of each of said deflecting means to form a flow passage therewith and to mount a plurality of vertically spaced baffle means having impeller means thereon, said baffle means being located intermediate said deflecting means, whereby mud may fall freely through the aforesaid openings and flow passages and be directed by different paths by said deflecting means and baffle means.

9. The combination of claim 8 including means for rotating said shaft and wherein said impeller means discharge mud outwardly from the baffle means by centrifugal force upon rotation of said shaft.

10. The combination of claim 8 wherein said deflecting means comprise centrally downwardly dished disks.

11. A gas separator for drilling mud comprising chamber means, liquid inlet means and gas outlet means communicating with an upper end of the chamber means, vertically spaced partition means fixedly mounted in said chamber means for directing liquid flow radially inwardly of the chamber means under the influence of gravity, central passage means disposed in said partition means for accommodating axial liquid flow downwardly therethrough, radially and circumferentially staggered, spaced passage means formed in said spaced partition means for accommodating interrupted vertical and radial gravity induced flow of liquid between the partition means, baffle means rotatably mounted within the chamber means between the spaced partition means for interrupting and deflecting said axial flow through the central passage means and liquid outlet means connected to a bottom end of the chamber means for receiving liquid from which gases have been separated.

12. The combination of claim 11, including means for imparting rotation to the baffle means to impel liquid deflected thereby to further encourage separation of gas therefrom under the influence of centrifugal force.

References Cited in the file of this patent
UNITED STATES PATENTS

| | | |
|---|---|---|
| 739,443 | Pertz | Sept. 22, 1902 |
| 1,187,591 | Woodry | June 20, 1916 |
| 1,452,253 | Nevitt | Apr. 17, 1923 |
| 1,667,139 | Borden | Apr. 24, 1928 |
| 2,047,157 | Rodman et al. | July 7, 1936 |
| 2,071,393 | Doherty | Feb. 23, 1937 |
| 2,082,863 | Weisgerber | June 8, 1937 |